(12) United States Patent
Wang et al.

(10) Patent No.: US 12,495,488 B2
(45) Date of Patent: Dec. 9, 2025

(54) DISPLAY PANEL AND DISPLAY DEVICE

(71) Applicant: Hefei Visionox Technology Co., Ltd., Anhui (CN)

(72) Inventors: Shanhe Wang, Hefei (CN); Tianyu Sun, Hefei (CN); Qin Qin, Hefei (CN); Kanglun Xia, Hefei (CN); Wen Li, Hefei (CN)

(73) Assignee: HEFEI VISIONOX TECHNOLOGY CO., LTD., Anhui (CN)

( * ) Notice: Subject to any disclaimer, the term of this patent is extended or adjusted under 35 U.S.C. 154(b) by 548 days.

(21) Appl. No.: 17/681,147

(22) Filed: Feb. 25, 2022

(65) Prior Publication Data

US 2022/0183148 A1   Jun. 9, 2022

Related U.S. Application Data

(63) Continuation of application No. PCT/CN2021/077694, filed on Feb. 24, 2021.

(30) Foreign Application Priority Data

Mar. 25, 2020   (CN) .......................... 202010220618.4

(51) Int. Cl.
  *H05K 1/02*   (2006.01)
  *G06F 3/041*   (2006.01)
  (Continued)

(52) U.S. Cl.
  CPC ......... *H05K 1/0281* (2013.01); *G06F 3/0412* (2013.01); *H05K 1/118* (2013.01); *H10K 77/111* (2023.02)

(58) Field of Classification Search
  CPC .... H05K 1/0281; H05K 1/118; G06F 3/0412; H10K 77/111
  See application file for complete search history.

(56) References Cited

U.S. PATENT DOCUMENTS

2016/0079329 A1    3/2016 Lee et al.
2016/0109998 A1*   4/2016 Watanabe ........... G02F 1/13338
                                                    345/173
(Continued)

FOREIGN PATENT DOCUMENTS

CN       203909752 U     10/2014
CN       106710449 A      5/2017
(Continued)

OTHER PUBLICATIONS

International Search Report with English Translation, PCT/CN2021/077694, May 28, 2021, 8 pgs.
(Continued)

*Primary Examiner* — Jay C Kim
*Assistant Examiner* — Woo K Lee
(74) *Attorney, Agent, or Firm* — Maier & Maier, PLLC

(57) ABSTRACT

A display panel and a display device. The display panel includes: a substrate layer, a flexible screen body, an adhesive layer and a touch control layer that are stacked in order. Each of the substrate layer, the flexible screen body, the adhesive layer and the touch control layer has a particular film/layer thickness. At least part of the adhesive layer is configured as a neutral layer of the display panel. Both the substrate layer and the flexible screen body are subject to a compressive stress when the display panel is bent. The touch control layer is subject to a tensile stress when the display panel is bent.

20 Claims, 7 Drawing Sheets

(51) Int. Cl.
  *H05K 1/11*   (2006.01)
  *H10K 77/10*  (2023.01)

(56) References Cited

U.S. PATENT DOCUMENTS

| | | | |
|---|---|---|---|
| 2016/0255713 A1 | 9/2016 | Kim et al. | |
| 2017/0309843 A1* | 10/2017 | Kim | B32B 3/30 |
| 2018/0047802 A1 | 2/2018 | Yoon et al. | |
| 2018/0287092 A1 | 10/2018 | Song et al. | |

FOREIGN PATENT DOCUMENTS

| | | | | |
|---|---|---|---|---|
| CN | 107104200 A | 8/2017 | | |
| CN | 107731102 A | 2/2018 | | |
| CN | 107799574 A | 3/2018 | | |
| CN | 108447886 A | 8/2018 | | |
| CN | 108878687 A | 11/2018 | | |
| CN | 109004100 A | 12/2018 | | |
| CN | 109309171 A | 2/2019 | | |
| CN | 109378332 A | 2/2019 | | |
| CN | 109411513 A | 3/2019 | | |
| CN | 109423226 A | 3/2019 | | |
| CN | 109449290 A | 3/2019 | | |
| CN | 109523921 A | 3/2019 | | |
| CN | 109546009 A | 3/2019 | | |
| CN | 109585514 A | 4/2019 | | |
| CN | 109733112 A | 5/2019 | | |
| CN | 109786426 A | 5/2019 | | |
| CN | 109817095 A | 5/2019 | | |
| CN | 109873090 A | 6/2019 | | |
| CN | 106340523 B | 8/2019 | | |
| CN | 110120183 A | 8/2019 | | |
| CN | 209327997 U | 8/2019 | | |
| CN | 110197620 A | 9/2019 | | |
| CN | 110444678 A | 11/2019 | | |
| CN | 110570762 A | 12/2019 | | |
| CN | 110635063 A | 12/2019 | | |
| CN | 110649176 A | 1/2020 | | |
| CN | 110828516 A | 2/2020 | | |
| CN | 110854177 A | 2/2020 | | |
| CN | 111383535 A | 7/2020 | | |
| CN | 109004100 B | * 11/2020 | ......... | H01L 27/3244 |
| JP | 2019144681 A | 8/2019 | | |
| KR | 20140084622 A | 7/2014 | | |
| WO | 2019061016 A1 | 4/2019 | | |

OTHER PUBLICATIONS

CN First Office Action with English Translation, CN 202010220618.4, Jun. 24, 2021, 14 pgs.

CN Second Office Action with English Translation, CN 202010220618.4, Aug. 30, 2021, 13 pgs.

Office Action issued on Apr. 12, 2022, in connection with corresponding Chinese Application No. 202010220618.4 (7 pp., including machine-generated English translation).

* cited by examiner

DISPLAY PANEL AND DISPLAY DEVICE

CROSS REFERENCE TO RELATED APPLICATIONS

The present application is a continuation of PCT patent application No. PCT/CN2021/077694 filed on Feb. 24, 2021, and claims priority to Chinese patent application No. 202010220618.4 filed on Mar. 25, 2020, which is incorporated by reference herein in its entirety.

TECHNICAL FIELD

The present disclosure relates to the field of display technology, and specifically relates to a display panel and a display device.

BACKGROUND

The organic light-emitting diode (OLED) display technology is advantageous by full solidity, active light-emitting, high contrast, ultra-thinness, low power consumption, fast response speed, wide operating range, easiness to implement flexible display and 3D display, etc., making it applicable to multiple displays, such as television and mobile display devices. In a preparation process of a screen like a right-angle screen, a waterfall screen or a surround screen, a flexible screen body needs to be bent, and a screen having a stacked structure needs to be fit to a curved-angle cover plate. In a fitting process, a conventional screen tends to cause a broken circuit or a broken encapsulation layer in a screen due to pulling of the circuit or encapsulation layer in the screen. As a result, water and oxygen may invade the flexible screen body and cause such abnormality as black spots and failing to display. This further affects yield of the screens and leads to waste of materials while being costly.

It is desired to reduce damage of a flexible screen body while being bent, and it is necessary to provide a new display panel and a new display device to address the problem.

SUMMARY

Some embodiments of the present disclosure provides a display panel and a display device with improved capability in bending, thereby effectively preventing a flexible screen body from being damaged in response to bending of the display panel.

Some embodiments of the present disclosure provides a display panel including a substrate layer, a flexible screen body, an adhesive layer and a touch control layer stacked in order. Each of the substrate layer, the flexible screen body, the adhesive layer and each touch control layer has a particular layer thickness. Herein, at least part of the adhesive layer is configured as a neutral layer of the display panel. Both the substrate layer and the flexible screen body are subject to a compressive stress when the display panel is bent. The touch control layer is subject to a tensile stress when the display panel is bent.

Further, the display panel includes a bearing layer disposed on a side of the substrate layer away from the flexible screen body. A side of the bearing layer away from the substrate layer is provided with at least one groove. By providing the at least one groove in the bearing layer, when the bearing layer is subject to a stress caused by deformation, the stress may be released through the at least one groove. In this way, the bearing layer would not be damaged due to excessive bending of the display panel, and thus bending performance of the display panel is improved.

Further, each of the at least one groove includes a central sub-groove and side sub-grooves provided on both sides of the central sub-groove, and a folding line of the display panel runs through the central sub-groove. In some embodiments, the central sub-groove has a depth greater than or equal to a depth of the side sub-grooves. Through a structure configured as such, a result of stress release by the at least one groove is better when the bearing layer is subject to the stress caused by deformation. In this way, damage to the bearing layer is further prevented during bending, and thus the bending performance of the display panel is further improved.

Further, the display panel further includes a support film disposed on a side of the substrate layer away from the flexible screen body, and a bearing film disposed on a side of the support film away from the substrate layer. Herein, at least one first groove is provided on a side of the support film away from the substrate layer and at least one second groove is provided on a side of the bearing film away from the support film. Through a structure configured as such, when the bearing film and the support film are subject to a stress caused by deformation, the stress may be released separately through the at least one second groove and the at least one first groove. In this way, the bearing film and the support film would not be damaged due to excessive bending of the display panel, and so bending performance of the display panel is further improved.

The touch control layer is provided with at least one stretch-proof metal line that is a curved line. The touch control layer is subject to the largest stress in the display panel when the display panel is bent. Therefore, by providing the at least one stretch-proof line on the touch control layer, the touch control layer can be more stretch-proof.

Further, the adhesive layer includes a graphical base layer and a graphical link layer. An orthographic projection of the graphical base layer on the flexible screen body and an orthographic projection of the graphical link layer on the flexible screen body are interlaced or non-overlapping with each other. In a thickness direction of the display panel, the graphical base layer has a height different from a height of the graphical link layer. In some embodiments, a height difference between the graphical base layer and the graphical link layer ranges from 5 μm to 20 μm. By providing the height difference between the graphical base layer and the graphical link layer, there may be a larger degree for deformation of the adhesive layer when the display panel is bent, and thus the adhesive layer is more stretch-proof.

The present disclosure provides a display device including the display panel.

The present disclosure is advantageous as follows. By disposing the adhesive layer capable of bonding the flexible screen body and the touch control layer, the flexible screen body and the touch control layer may be prevented from escaping away from each other or even broken when the display panel is bent. In this way, a bending capability of the display panel is improved. When the display panel is bent, the neutral layer of the display panel is neither subject to a compressive stress nor a tensile stress; while an inner side of the neutral layer is subject to compressive stress while an external side of the neutral layer is subject to a tensile stress. In addition, the flexible screen body is prone to being broken under a tensile stress but is not prone to being broken under a compressive stress. Therefore, by setting particular thicknesses for the substrate layer, the flexible screen body, the adhesive layer and the touch control layer, at least part of the adhesive layer is the neutral layer of the display panel. As a result, both the substrate layer and the flexible screen body are subject to a compressive stress when the display panel is bent. That is, the flexible screen body is an inner layer of the display panel when the display panel is bent, and so the flexible screen body is subject to a compressive stress. In this way, the flexible screen body is effectively prevented from being damaged in response to bending of the display panel.

BRIEF DESCRIPTION OF THE DRAWINGS

One or more embodiments are exemplified with reference to the corresponding figures in the accompanying drawings, but the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

In a stacked design of a current display panel, a film/layer of a display panel is generally thin, and it is easy to bend a screen body of the display. However, a risk exists that a flexible screen body layer may be stretched.

Therefore, some embodiments of the present disclosure provide a display panel and a display device. Herein, an adhesive layer or part of the adhesive layer is configured as a neutral layer of the display panel, and the flexible screen body is subject to a compressive stress when the display panel is bent. This ensures that the flexible screen body is not subject to a tensile stress when the display panel is bent. In this way, the flexible screen body may be prevented from being damaged by bending of the display panel.

In order to clarify the objective, the technical solutions and the advantages of the present disclosure, embodiments of the present disclosure will be described in detail in the following with reference to the accompanying drawings. However, those of ordinary skill in the art may understand that technical details are provided in the embodiments of the present disclosure to facilitate understanding by readers. Nevertheless, the technical solutions that the present disclosure claims to protect may still be implemented without the technical details and variations and modification based on the following embodiments.

Figure 1:
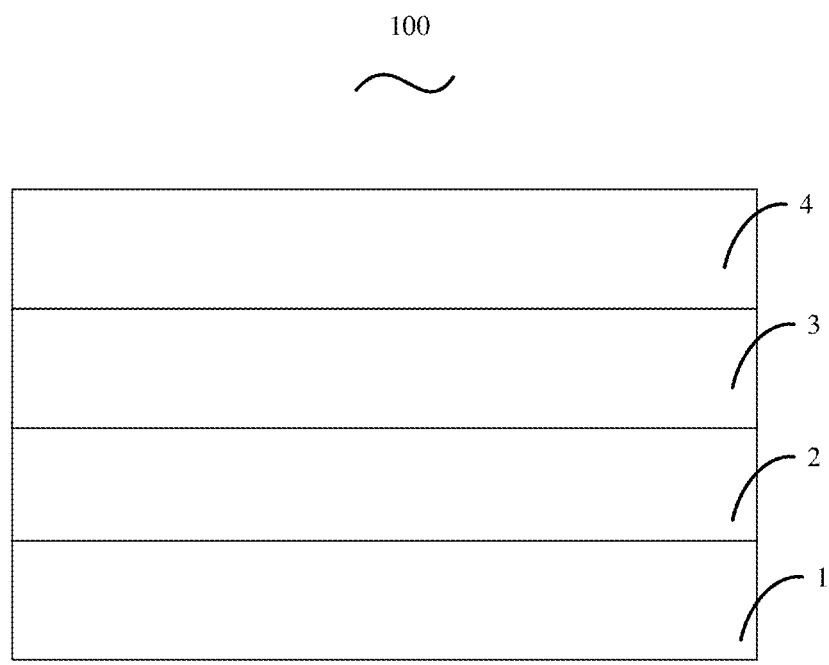
FIG. 1 is a schematic diagram showing a structure of a display panel according to some embodiments of the present disclosure.

Some embodiments of the present disclosure relates to a display panel 100. A particular structure of the display panel 100 is shown in FIG. 1.

The display panel 100 includes a substrate layer 1, a flexible screen body 2, an adhesive layer 3 and a touch control layer 4 which are stacked in order. Each of the substrate layer 1, the flexible screen body 2, the adhesive layer 3 and the touch control layer 4 has a particular layer thickness. Herein, at least part of the adhesive layer 3 is configured as a neutral layer of the display panel 100. Both the substrate layer 1 and the flexible screen body 2 are subject to a compressive stress when the display panel 100 is bent. The touch control layer 4 is subject to a tensile stress when the display panel 100 is bent. It may be appreciated that "at least part of the adhesive layer 3 is configured as a neutral layer of the display panel 100" means that the adhesive layer 3 has a particular thickness, and in a thickness direction, at least part of the adhesive layer 3 with a certain thickness is configured as the neutral layer of the display panel 100.

In practice, the substrate layer 1 may be made of such polymer materials as imide (PI), polycarbonate (PC), polyethersulfone (PES), polyethylene terephthalate (PET), polyethylene naphthalate (PEN), polyarylate (PAR) or glass fiber reinforced plastic (FRP). The substrate layer 1 may be transparent, translucent or opaque, and provides support for formation of each layer thereon.

The flexible screen body 2 in this embodiment includes but is not limited to a planarization layer, a pixel definition layer, an organic light-emitting layer, a cathode and an anode. The planarization layer may be an organic layer made of acrylic, polyimide (PI), benzocyclobutene (BCB) and so on. The anode may be an indium tin oxide transparent conductive film. The organic light-emitting layer may include other various functional layers such as at least one of a hole injection layer (HIL), a hole transport layer (HTL), an electron transport layer (ETL) and an electron injection layer (EIL). The cathode is a transparent electrode which is a film/layer made of lithium (Li), calcium (Ca), lithium fluoride/calcium (LiF/Ca), lithium fluoride/aluminum (LiF/Al), aluminum (Al), magnesium (Mg) or compounds of these substances.

The adhesive layer 3 in this embodiment is made of pressure sensitive adhesive. The pressure sensitive adhesive is adhesive sensitive to pressure. Generally, a peel force (a peel force rendered after an adhesive tape is adhered to a surface under pressure) of the pressure sensitive adhesive is less than a cohesive force (an acting force between molecules of the pressure sensitive adhesive) of the adhesive which in turn is less than an adhesive force (an adhesive force between the adhesive and a base material) of the adhesive. In this way, no such case as degumming can occur during use of the pressure sensitive adhesive. In an example, the adhesive layer 3 is made of optically clear adhesive (OCA) or optically clear resin (OCR). Both OCA and OCR are strongly adhesive and transparent. Therefore, while an adhesive force between the flexible screen body 2 and the touch control layer 4 are enhanced, light-emitting performance of the flexible screen body 2 under the adhesive layer 3 is less affected by color of the adhesive layer 3. In this way, display effect of the display panel 100 is improved. It may be appreciated that the material for the adhesive layer 3 is not specifically defined in this embodiment. Any other adhesives capable of bonding the flexible screen body 2 and the touch control layer 4 fall into the protection scope of this embodiment.

In this embodiment, by disposing the adhesive layer 3 capable of bonding the flexible screen body 2 and the touch control layer 4, the flexible screen body 2 and the touch control layer 4 may be prevented from escaping away from each other or even broken when the display panel 100 is bent. In this way, a bending property of the display panel 100 is promoted. When the display panel 100 is bent, the neutral layer of the display panel 100 is neither subject to a compressive stress nor a tensile stress; an inner side of the neutral layer is subject to compressive stress, while an external side of the neutral layer is subject to tensile stress. In addition, the flexible screen body 2 is prone to being broken under a tensile stress but is not prone to being broken under a compressive stress. Therefore, by setting particular thicknesses for the substrate layer 1, the flexible screen body 2, the adhesive layer 3 and the touch control layer 4, at least part of the adhesive layer 3 serves as the neutral layer of the display panel. As a result, both the substrate layer 1 and the flexible screen body 2 are subject to a compressive stress when the display panel 100 is bent. That is, the flexible screen body 2 is an inner layer of the display panel 100 when the display panel is bent, and so the flexible screen body 2 is subject to a compressive stress. In this way, the flexible screen body 2 is effectively prevented from being damaged in response to bending of the display panel 100.

Figure 2:
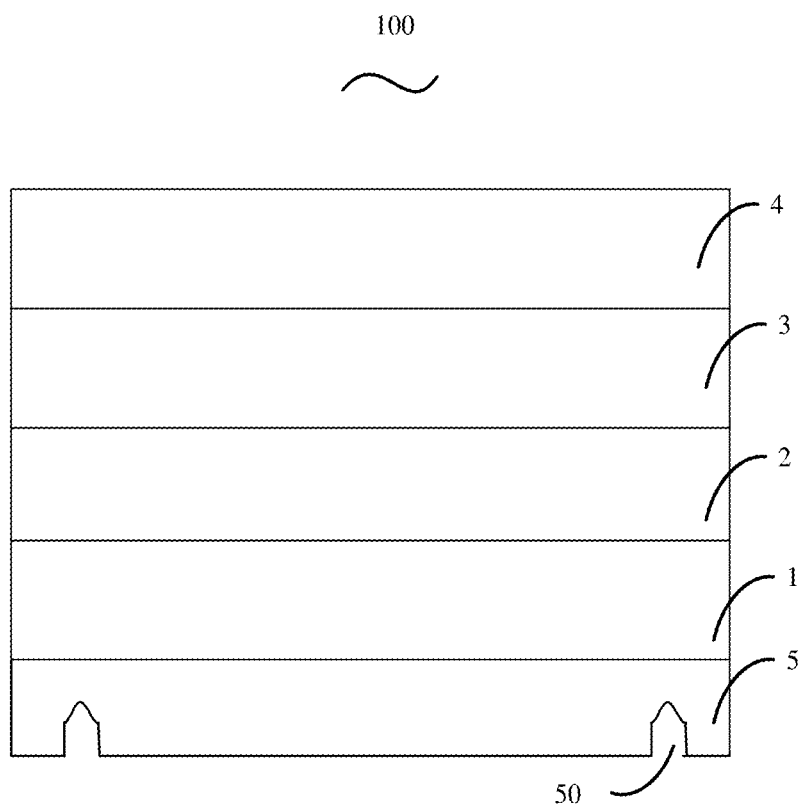
FIG. 2 is a schematic diagram showing another structure of the display panel according to some embodiments of the present disclosure.

With reference to FIG. 2, in this embodiment, the display panel 100 further includes a bearing layer 5 disposed on a side of the substrate layer 1 away from the flexible screen body 2. A side of the bearing layer 5 away from the substrate layer 1 is provided with at least one groove 50. A material of the bearing layer 5 is one of polyethylene terephthalate (PET), polyethene (PE) and o-phenylphenol (OPP). The material of the bearing layer 5 is not specifically defined in this embodiment. By providing the at least one groove 50 in the bearing layer 5, when the bearing layer 5 is subject to a stress caused by deformation, the stress may be released through the groove 50. In this way, the bearing layer 5 would not be damaged due to excessive bending of the display panel 100, thus bending property of the display panel 100 is improved.

It shall be noted that in this embodiment, the bearing layer 5 has a thickness of 10 μm to 120 μm, a Poisson's ratio of 0.05 to 0.75, and a Young's modulus of 0.02 GPa to 10 GPa. The substrate layer 1 has a thickness of 8 μm to 18 μm, a Poisson's ratio of 0.1 to 0.6, and a Young's modulus of 0.5 GPa to 20 GPa. The flexible screen body 2 has a thickness of 10 μm to 19 μm, a Poisson's ratio of 0.1 to 0.5, and a Young's modulus of 30 GPa to 120 GPa. The adhesive layer 3 has a thickness of 80 μm to 120 μm, a Poisson's ratio of 0.2 to 0.5, and a Young's modulus of 0.0002 GPa to 0.001 GPa. The touch control layer 4 has a thickness of 80 μm to 120 μm, a Poisson's ratio of 0.1 to 0.7, and a Young's modulus of 0.05 GPa to 80 GPa. In an example, the touch control layer 4 has a thickness of 40 μm to 90 μm, a Poisson's ratio of 0.1 to 0.7, and a Young's modulus of 0.05 GPa to 30 GPa. By optimizing parameters (i.e., thickness, Poisson's ratio and Young's modulus) of each film/layer, deformation occurs first to the bearing layer 5 which does not have significant influence on performance of the display panel 100 when the display panel 100 deforms. In this way, the flexible screen body 2 is further prevented from being damaged when the display panel is bent and the bending property of the display panel 100 is improved. It may be appreciated that there are more other parameter settings for a thickness of each film/layer that cause the deformation to occur first to the bearing layer 5. The parameter settings of thicknesses of the film/layers as described in the above are only examples, but are not intended to limit the thicknesses of the film/layers (the substrate layer 1, the flexible screen body 2, the adhesive layer 3, the touch control layer 4 and the bearing layer 5) herein.

In some examples, a ratio of a depth of the at least one groove 50 and a thickness of the bearing layer 5 ranges from 1/3 to 1/2. That is, when the thickness of the bearing layer 5 is 120 μm, the depth of the groove 50 ranges from 40 μm to 60 μm. A smaller depth of the at least one groove 50 may result in a poor release of a stress, while a greater depth may risk the bearing layer being broken. A range of the depth as provided in this embodiment may enable the at least one groove 50 to release a stress generated upon deformation of the bearing layer 5, and the bearing layer 5 would not be broken due to an excessively great depth of the groove 50.

It shall be noted that in this embodiment, the at least one groove 50 may have a cross sectional shape of one of a triangle, a fillet triangle, and a fillet rectangle. For example, the at least one groove 50 shown in FIG. 2 has a cross sectional shape of a fillet rectangle. Herein, the cross sectional shape of the groove 50 is viewed in the thickness direction of the display panel, i.e., a direction vertical to the surface of substrate layer 1. It may be appreciated that a shape of the groove 50 is not specifically limited in this embodiment.

Figure 3:
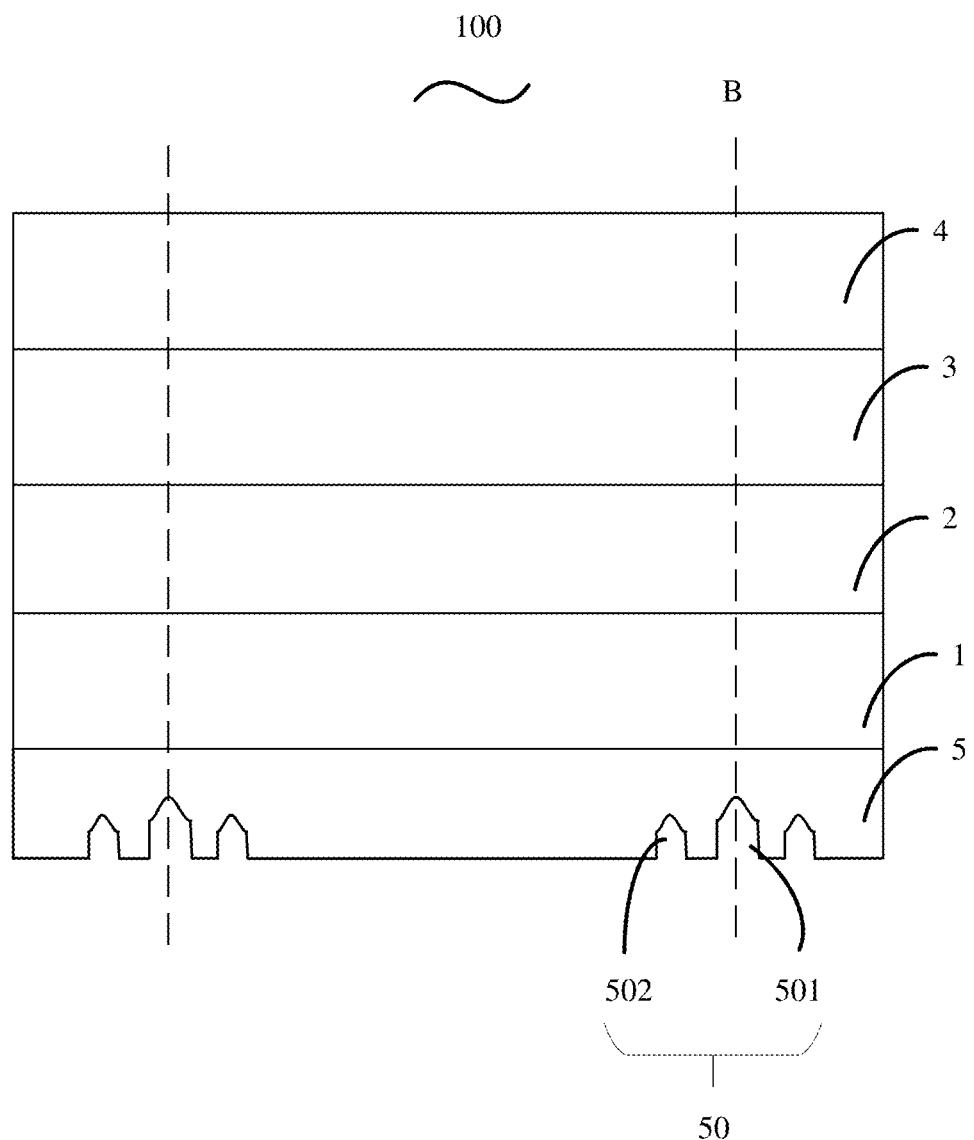
FIG. 3 is a schematic diagram showing yet another structure of the display panel according to some embodiments of the present disclosure.

With reference to FIG. 3, the groove 50 includes a central sub-groove 501 and side sub-grooves 502 evenly provided on both sides of the central sub-groove 501, and the display panel 100 being foldable with a folding line B extend through the central sub-groove 501 (i.e., the folding line B runs through the central sub-groove 501 in FIG. 3). During preparation of the display panel 100, sizes of each film/layer of the display panel 100 may be predetermined. With size information for a bending part of a cover plate of the display panel 100, an intersecting line, i.e., a bending line B, resulted from intersection of a dividing line (e.g., folding line) of the cover plate's arc with each film/layer may be obtained. It may be appreciated that the number of bending lines B is not limited to two as shown in FIG. 3, but may be another number. Through a structure configured as such, a result of stress release by the groove 50 is better when the bearing layer 5 is subject to the stress caused by deformation. In this way, damage to the bearing layer 5 is further prevented during bending, and thus the bending performance of the display panel 100 is further improved.

In an example, there are an odd number of sub-grooves included in the groove 50 at each bending line B. Take three sub-grooves at each bending line B as an example, the sub-grooves include one central sub-groove 501 and two side sub-grooves 502. The two side sub-grooves 502 are disposed on both sides of the central sub-groove 501 respectively. A part of the bending line B overlaps a median line of the central sub-groove 501. It shall be noted that in this embodiment, distances between adjacent grooves 50 are not specifically limited but may be either equal or unequal which may cause the same technical result. In addition, in this embodiment, cross sectional shapes of the central sub-groove 501 and the side sub-grooves 502 are not specifically limited but may be either the same or different. For example, the central sub-groove 501 and the side sub-grooves 502 may be fillet rectangles. Or, the central sub-groove 501 is a triangle while the side sub-grooves 502 are fillet triangles.

In some examples, the central sub-groove 501 has a depth greater than or equal to a depth of the side sub-grooves 502. Because the central sub-groove 501 is provided at the bending line B which is under a largest stress in the display panel 100 when the display panel 100 is bent. Therefore, the depth of the central sub-groove 501 is provided as greater than or equal to the depth of the side sub-grooves 502. In this way, the result of stress release by the central sub-groove 501 can be improved, and thus the bending performance of the display panel 100 is further improved.

Figure 4:
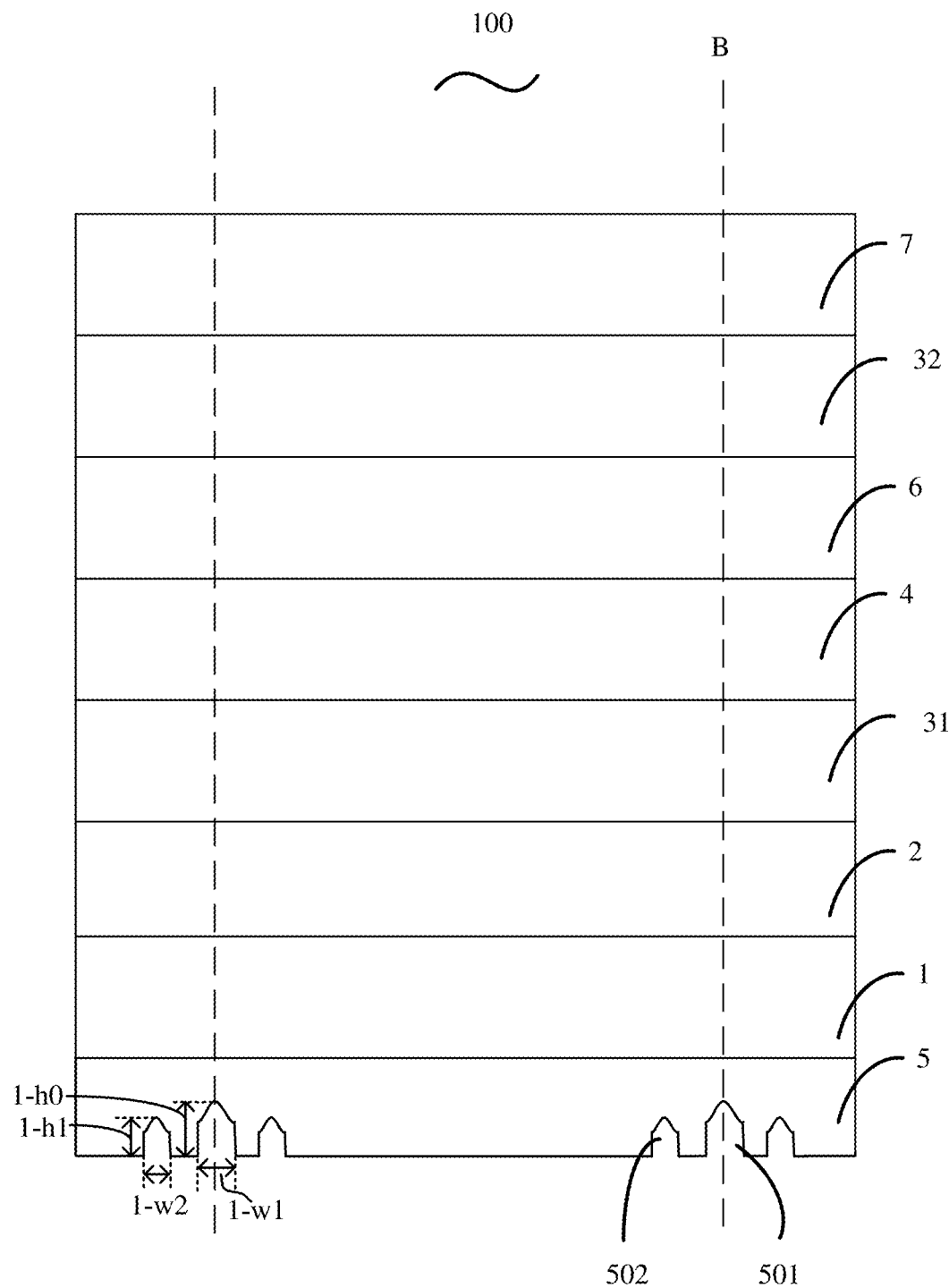
FIG. 4 is a schematic diagram showing still a further structure of the display panel according to some embodiments of the present disclosure.

In some examples, the groove 50 has a depth equal to a width of an opening of the groove 50. Through a structure configured as such, a result of stress release by the groove 50 is better. In an example, as shown in FIG. 4, the central sub-groove 501 has a depth of 1-h0 larger than a width of 1-w1 of an opening of the central sub-groove 501. The side sub-groove 502 has a depth of 1-h1 larger than a width of 1-w2 of an opening of the side sub-groove 502. In an example, the central sub-groove 501 has a depth of 1-h0 equal to a width of 1-w1 of an opening of the central sub-groove 501. The side sub-groove 502 has a depth of 1-h1 equal to a width of 1-w2 of an opening of the side sub-groove 502. It may be appreciated that in this embodiment, a ratio of the depth of the groove 50 and the width of the opening of the groove 50 is not specifically limited. Depths and widths of the opening of the groove 50 may be designed with different sizes as desired.

With reference to FIG. 4, in this embodiment, the display panel 100 further includes a polarizer layer 6 and a cover plate 7. The adhesive layer 3 includes a first adhesive film 31 and a second adhesive film 32. The first adhesive film 31 is disposed between the flexible screen body 2 and the touch control layer 4. The polarizer layer 6 is disposed on a side of the touch control layer 4 away from the first adhesive film 31. The cover plate 7 is disposed on a side of the polarizer layer 6 away from the touch control layer 4. The second adhesive film 32 is disposed between the polarizer layer 6 and the cover plate 7. In this embodiment, the cover plate 7 may be either plastic or glass. A material for the cover plate 7 is not specifically limited. By disposing the polarizer layer 6, a display effect of the display panel 100 may be improved. Generally, both the cover plate 7 and the polarizer layer 6 are made of a rigid material. Through a structure configured as such, on the one hand, the cover plate 7 does not directly contact the polarizer layer 6. This avoids a case when the display panel 100 is bent, the cover plate 7 which is rigid tends to damage the polarizer layer 6 if the cover plate 7 directly contacts the polarizer layer 6 which is also rigid. In this way, the polarizer layer 6 is not prone to damage when the display panel 100 is bent, because the polarizer layer 6 contacts the second adhesive film 32 which is of a flexible material. Therefore, the display panel 100 is more reliable. On the other hand, the cover plate 7 and the polarizer layer 6 are bonded by strong adhesive. In this way, the polarizer layer 6 is prevented from falling off the display panel 100 when the display panel is bent or when a protection film on the cover plate 7 is torn off, and thus the bending performance of the display panel 100 is further improved.

In an example, the first adhesive film 31 has a thickness of 80 μm to 120 μm, a Poisson's ratio of 0.2 to 0.5, and a Young's modulus of 0.0002 GPa to 0.001 GPa. The second adhesive film 32 has a thickness of 80 μm to 120 μm, a Poisson's ratio of 0.1 to 0.7, and a Young's modulus of 0.0002 GPa to 0.001 GPa. The polarizer layer 6 has a thickness of 120 μm to 280 μm, a Poisson's ratio of 0.1 to 0.7, and a Young's modulus of 3 GPa to 14 GPa. Through thickness parameters provided as such, the neutral layer of the display panel 100 is within the first adhesive film 31, and when the display panel 100 is bent, deformation occurs first on the bearing layer 5 which does not have significant influence on the performance of the display panel 100. In this way, the flexible screen body 2 is further prevented from being damaged when the display panel 100 is bent and the bending performance of the display panel 100 is improved.

Figure 5:
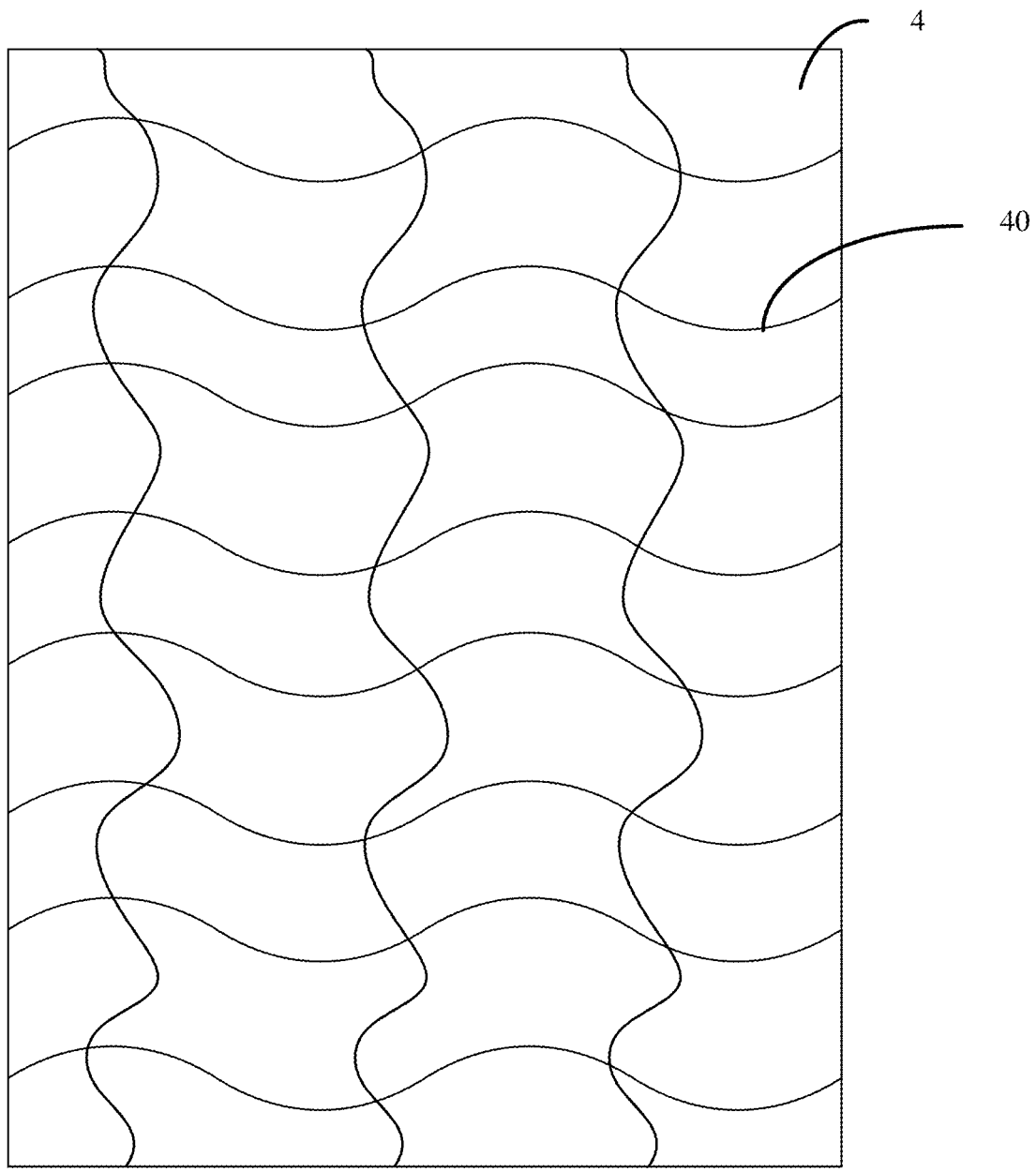
FIG. 5 is a top view of a touch control layer according to some embodiments of the present disclosure.

With reference to FIG. 5, the touch control layer 4 is provided with at least one stretch-proof line 40 which is a curved line. The touch control layer 4 is under the largest tensile stress in the display panel 100 when the display panel 100 is bent. Therefore, by providing the at least one stretch-proof line 40 on the touch control layer 4, the touch control layer can be more stretch-proof. It shall be noted that in some examples, the at least one stretch-proof line 40 is a metal line which is well stretch-proof and may be taken as a part that implements a touch control function (i.e., be taken as a conductive line of the touch control layer 4 for use). In some examples, the stretch-proof line 40 is an argentum (Ag) nanometer line with good conductivity and ductility, low cost and simple processing. Alternatively, copper or gold may be selected. A material for the stretch-proof line is not specifically limited in this embodiment. It shall be noted that within an orthographic projection plane of the display panel 100, the at least one stretch-proof line may form a net surface or an intersected S-type. Herein, the net surface is better in stretch proof and touch control.

Figure 6:
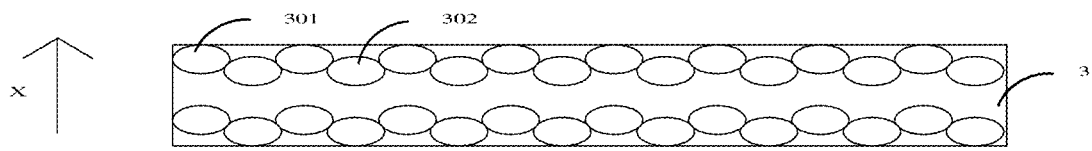
FIG. 6 is a sectional view of an adhesive layer according to some embodiments of the present disclosure.
Figure 7:
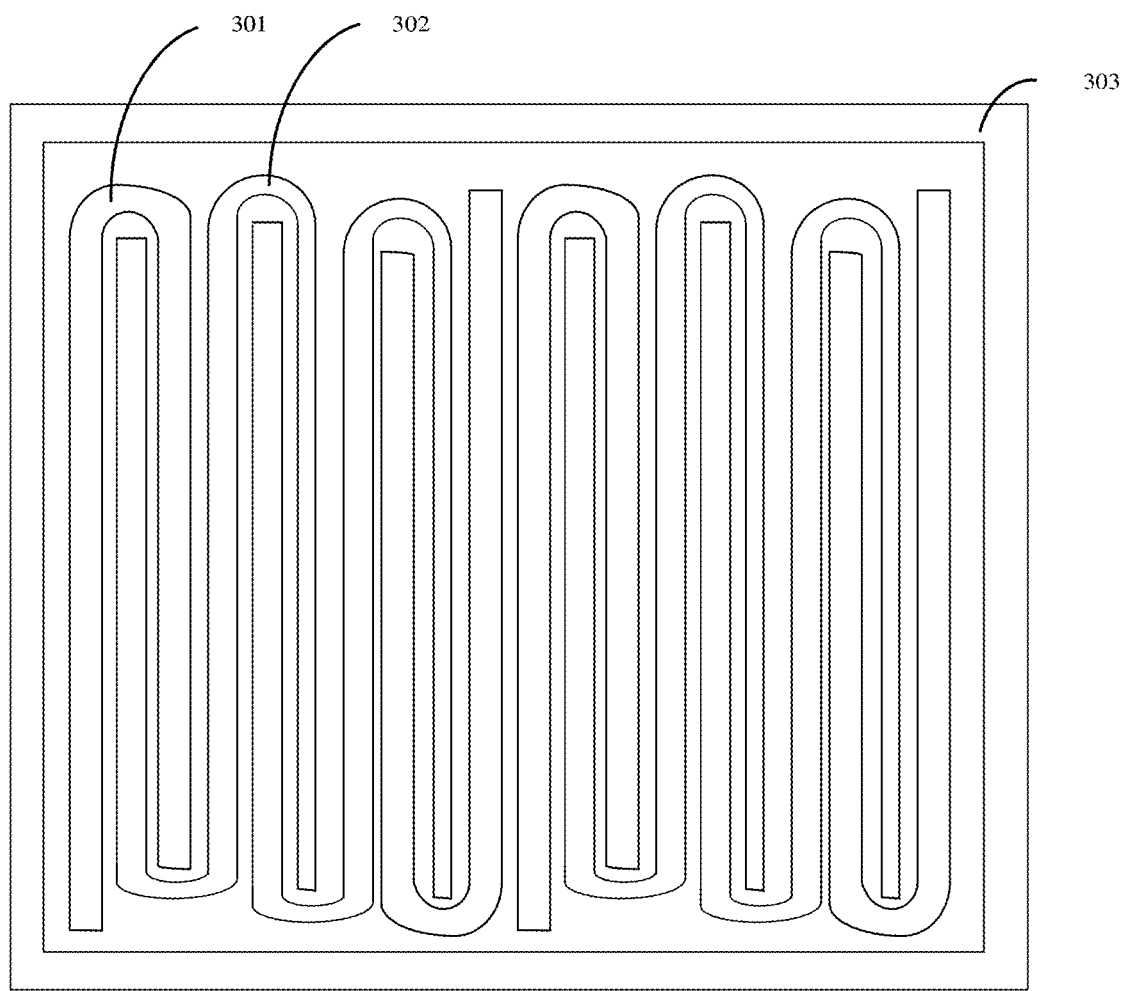
FIG. 7 is a top view of the adhesive layer according to some embodiments of the present disclosure.

With reference to FIG. 6 and FIG. 7, in this embodiment, the adhesive layer 3 includes a graphical base layer 301 and a graphical link layer 302. An orthographic projection of the graphical base layer 301 on the flexible screen body 2 and an orthographic projection of the graphical link layer 302 on the flexible screen body 2 are interlaced or non-overlapping with each other. In a thickness direction X of the display panel 100, the graphical base layer 301 has a height different from a height of the graphical link layer 302. In an example, the graphical base layer 301 is of an S-type, and the graphical link layer 302 is also of an S-type. The S-type graphical base layer 301 and the S-type graphical link layer 302 are good in stretch proof. In addition, a height difference between the graphical base layer 301 and the graphical link layer 302 is 5 μm to 20 μm. This range of height difference can improve stretch proof of the adhesive layer 3 while ensuring that an adhesive force of the adhesive layer 3 is not influenced by too much height difference. By providing the height difference between the graphical base layer 301 and the graphical link layer 302, there may be a larger degree for deformation of the adhesive layer 3 when the display panel 100 is bent, and so the adhesive layer 3 is more stretch-proof. It shall be noted that in this embodiment, a shape of the graphical base layer 301 or the graphical link layer 302 is not specifically limited and may further be a net-shaped or an 8-shaped.

In some examples, the adhesive layer 3 further includes an edge compensation layer 303. The edge compensation layer 303 is to compensate a region uncovered by the graphical base layer 301 and the graphical link layer 302, so as to ensure evenness and adhesiveness of an edge of the adhesive layer 3. In an example, the edge compensation layer 303 may be OCA or pressure sensitive adhesive. In this embodiment, a material for the edge compensation layer 303 is not specifically limited.

In an example, the graphical base layer 301 and the graphical link layer 302 are stacked structures. The stacked structures can make the adhesive layer 3 more stretch-proof and more adhesive, and thus the bending performance of the display panel 100 is further improved.

Figure 8:
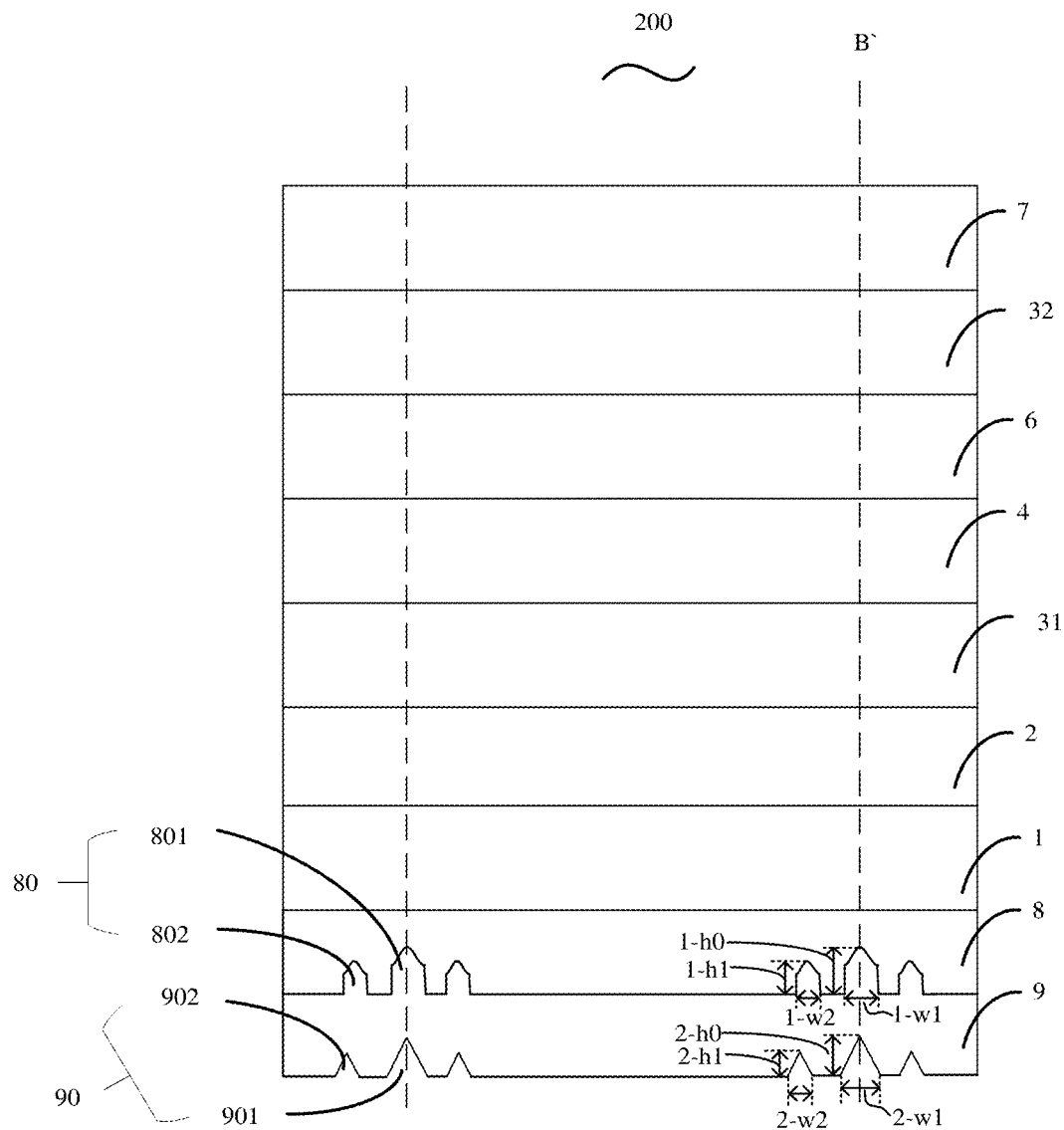
FIG. 8 is a schematic diagram showing a structure of a display panel according to some embodiments of the present disclosure.

In some embodiments, instead of the display panel including a bearing layer 5 disposed on a side of the substrate layer 1 away from the flexible screen body 2, e.g., as shown in FIG. 2, the display panel 200 includes a support film 8 disposed on a side of the substrate layer 1 away from the flexible screen body 2, and a bearing film 9 disposed on a side of the support film 8 away from the substrate layer 1, as shown in FIG. 8. Herein, at least one first groove 80 is provided on a side of the support film 8 away from the substrate layer 1 and at least one second groove 90 is provided on a side of the bearing film 9 away from the support film 8. Through a structure configured as such, when the bearing film 9 and the support film 8 are under a stress caused by deformation, the stress may be released separately through the at least one second groove 90 and the at least one first groove 80. In this way, the bearing film 9 and the support film 8 would not be damaged due to excessive bending of the display panel 200, and thus bending performance of the display panel 200 is further improved.

In an example, a material for the bearing film 9 is one of polyethylene terephthalate (PET), poly ethylene (PE) and o-phenylphenol (OPP). A material for the support film 8 is one of PET, PE and OPP. The bearing film 9 and the support film 8 may be of the same or different materials. In this embodiment, a material for the bearing film 9 and a material for the support film 8 are not limited herein.

In an example, the bearing film 9 has a thickness of 10 μm to 120 μm, a Poisson's ratio of 0.05 to 0.75, and a Young's modulus of 0.02 GPa to 10 GPa. The support film 8 has a thickness of 10 μm to 105 μm, a Poisson's ratio of 0.1 to 0.5, and a Young's modulus of 1 GPa to 40 GPa. By optimizing parameters (i.e., thickness, Poisson's ratio and Young's modulus) of each film/layer, deformation occurs first to the bearing film 9 and the support film 8 which do not have significant influence on performance of the display panel 200 when the display panel 200 deforms. In this way, the flexible screen body 2 is further prevented from being damaged when the display panel 200 is bent and the bending performance of the display panel 200 is improved. It may be appreciated that there are more other parameter settings for thicknesses that cause the deformation to occur first to the bearing film 9 and the support film 8. The parameter settings of the thicknesses of the film/layers as described in the above are only examples, but are not intended to limit the thicknesses of the film/layers (the substrate layer 1, the flexible screen body 2, the adhesive layer 3, the touch control layer 4, the bearing film 9, the support film 8 and the polarizer layer 6) herein.

It shall be noted that an orthographic projection of the at least one first groove 80 on the substrate layer 1 may or may not overlap an orthographic projection of the at least one second groove 90 on the substrate layer 1. The same technical result may be achieved under both conditions.

In some examples, one first groove 80 includes a first central sub-groove 801 and first side sub-grooves 802 evenly provided on two sides of the first central sub-groove 801 respectively. A folding line B' of the display panel 200 runs through the first central sub-groove 801. The second groove 90 includes a second central sub-groove 901 and second side sub-grooves 902 evenly provided on two sides of the second central sub-groove 901 respectively. The folding line B' of the display panel 200 runs through the second central sub-groove 901. Through a structure configured as such, a result of stress release by the first groove 80 and the second groove 90 is better when the support film 8 and the bearing film 9 are under the stress caused by deformation. In this way, damage to the support film 8 and the bearing film 9 is further prevented during bending, and thus the bending performance of the display panel 200 is further improved.

In an example, there are an odd number of the first sub-grooves included in the first groove 80 and an odd number of the second sub-grooves included in the second groove 90 at each bending line B'. Further description is made by taking five first grooves 80 and five second grooves 90 at each bending line B as an example. Each of the at least one first groove 80 include one first central sub-groove 801 and four first side sub-grooves 802. The four first side sub-grooves 802 are respectively disposed on both sides of the first central sub-groove 801 (two first side sub-grooves 802 are provided on a left side of the first central sub-groove 801, and another two first side sub-grooves 802 are provided on a right side of the first central sub-groove 801). A part of the bending line B' overlaps a median line of the first central sub-groove 801. Each of the at least one second groove 90 includes one second central sub-groove 901 and four second side sub-grooves 902. The four second side sub-grooves 902 are respectively disposed on both sides of the second central sub-groove 901 (two second side sub-grooves 902 are provided on a left side of the second central sub-groove 901, and the other two second side sub-grooves 902 are provided on a right side of the second central sub-groove 901). A part of the bending line B' overlaps a median line of the second central sub-groove 901.

It shall be noted that in this embodiment, distances between adjacent grooves on the same film/layer are not specifically defined but may be either equal or unequal which may result in the same technical result. In addition, in this embodiment, shapes of the central sub-groove and the side sub-grooves in the same film/layer are not specifically defined but may be either the same or different. For example, the central sub-groove and the side sub-grooves may be fillet rectangles. Or, the central sub-groove is a triangle while the side sub-grooves are fillet triangles. In addition, in this embodiment, cross sectional shapes of grooves in different film/layers are not specifically limited. For example, the first grooves 80 in the support film 8 and the second grooves 90 on the bearing film 9 may have a cross sectional shape of a triangle. Alternatively, the first grooves 80 each have a cross sectional shape of a fillet triangle, while the second grooves 90 each have a cross sectional shape of a fillet rectangle.

In an example, as shown in FIG. 8, the first central sub-groove 801 has a depth of 1-h0 larger than a width of 1-w1 of an opening of the first central sub-groove 801. The first side sub-grooves 802 have a depth of 1-h1 larger than a width of 1-w2 of an opening of the first side sub-grooves 802. In an example, the first central sub-groove 801 has a depth of 1-h0 equal to a width of 1-w1 of an opening of the first central sub-groove 801. The first side sub-grooves 802 have a depth of 1-h1 equal to a width of 1-w2 of an opening of the first side sub-grooves 802. It may be appreciated that in this embodiment, a ratio of a depth of the first grooves 80 and a width of the opening of the first grooves 80 is not specifically limited. Depths and widths of openings of the first grooves 80 may be designed with different sizes as desired. In addition, in an example, as shown in FIG. 8, the second central sub-groove 901 has a depth of 2-h0 larger than a width of 2-w1 of an opening of the second central sub-groove 901. The second side sub-grooves 902 have a depth of 2-h1 larger than a width of 2-w2 of an opening of the second side sub-grooves 902. In an example, the second central sub-groove 901 has a depth of 2-h0 equal to a width of 2-w1 of an opening of the second central sub-groove 901. The second side sub-grooves 902 have a depth of 2-h1 equal to a width of 2-w2 of an opening of the second side sub-grooves 902. It may be appreciated that in this embodiment, a ratio of a depth of the second grooves 90 and a width of the opening of the second grooves 90 is not specifically limited. Depths and widths of the openings of the second grooves 90 may be designed with different sizes as desired.

Through a structure configured as such, a result of stress release by a groove may be further improved.

Some embodiments of the present disclosure relates to a display device 300 including the display panel described in the above embodiments.

Those of ordinary skill in the art may appreciate that the above embodiments are specific embodiments of the present disclosure. In practice, the above embodiments may be modified in terms of form and detail without departing from the spirit and scope of the present disclosure.

What is claimed is:

1. A display panel, comprising: a substrate layer, a flexible screen body, an adhesive layer and a touch control layer that are stacked in order, wherein:
the flexible screen body is abutting the substrate layer, the adhesive layer is abutting the flexible screen body, and the touch control layer is abutting a top of the adhesive layer,
the adhesive layer is located between the flexible screen body and the touch control layer, wherein the adhesive layer is solid and optically transparent,
wherein the adhesive layer comprises a graphical base layer and a graphical link layer, an orthographic projection of the graphical base layer on the flexible screen body and an orthographic projection of the graphical link layer on the flexible screen body are non-overlapping, and the graphical base layer has a height different from a height of the graphical link layer in a thickness direction of the display panel,
the substrate layer and the flexible screen body are made with materials that are configured to be under a compressive stress when the display panel is bent, and
the touch control layer is configured to be under a tensile stress when the display panel is bent;
the graphical base layer is of an S-type, and
wherein the graphical base layer and the graphical link layer are arranged in an interdigitated manner.

2. The display panel according to claim 1, further comprising a bearing layer disposed on a side of the substrate layer away from the flexible screen body, a side of the bearing layer away from the substrate layer being provided with at least one groove;
wherein the display panel is foldable along at least one folding line, the at least one folding line are positioned on both sides of a centerline of the display panel and symmetrically arranged about the centerline, and the at least one groove is arranged at positions of the at least one folding line respectively.

3. The display panel according to claim 2, wherein a ratio of a depth of the least one groove and a thickness of the bearing layer ranges from 1/3 to 1/2.

4. The display panel according to claim 2, wherein:
each of the at least one groove includes a central sub-groove and side sub-grooves evenly provided on both sides of the central sub-groove;
at least one side groove of the side sub-grooves has a depth equal to a width of an opening of the at least one groove;
the central sub-groove has a depth greater than a depth of each of the side sub-grooves; and
the at least one groove has a cross-sectional shape of one of a triangle, a fillet triangle, and a fillet rectangle.

5. The display panel according to claim 2, wherein each of the least one groove comprises a central sub-groove, and at least two side sub-grooves provided on both sides of the central sub-groove, forming a groove set distributed in an edge region of the display panel; and the central sub-groove has a depth greater than a depth of each of the at least two side sub-grooves;
each of the central sub-groove and the at least two side sub-grooves has a cross-section shape of a combination of a triangle and a rectangle, with the triangle located on a side of the rectangle facing the flexible screen body;
one of the at least one folding line extends through the central sub-groove and overlaps with a vertex of the triangle away from the rectangle.

6. The display panel according to claim 2, wherein:
the bearing layer has a thickness of 10 μm to 120 μm, a Poisson's ratio of 0.05 to 0.75, and a Young's modulus of 0.02 GPa to 10 GPa; and/or
the adhesive layer has a thickness of 80 μm to 120 μm, a Poisson's ratio of 0.2 to 0.5, and a Young's modulus of 0.0002 GPa to 0.001 GPa, and
a material of the adhesive layer is pressure sensitive adhesive, optically clear adhesive or optically clear resin.

7. The display panel according to claim 1, further comprising:
a support film disposed on a side of the substrate layer away from the flexible screen body, and
a bearing film disposed on a side of the support film away from the substrate layer;
wherein at least one first groove is provided on a side of the support film away from the substrate layer and at least one second groove is provided on a side of the bearing film away from the support film.

8. The display panel according to claim 7, wherein
a ratio of a depth of the at least one first groove and a thickness of the bearing film ranges from 1/3 to 1/2; and/or
the at least one first groove has a depth equal to a width of an opening of the at least one first groove; and/or
the at least one first groove has a cross-sectional shape of one of a triangle, a fillet triangle, and a fillet rectangle.

9. The display panel according to claim 7, wherein
a ratio of a depth of the at least one second groove and a thickness of the bearing film ranges from 1/3 to 1/2; and/or
the at least one second groove has a depth equal to a width of an opening of the at least one second groove; and/or
the at least one second groove has a cross-sectional shape of one of a triangle, a fillet triangle, and a fillet rectangle.

10. The display panel according to claim 7, wherein each of the at least one first grooves comprises:
a first central sub-groove, and
at least two first side sub-grooves respectively provided on both sides of the first central sub-groove, and the display panel is foldable with a folding line thereof configured to run through the first central sub-groove;
each of the at least one second grooves comprises:
a second central sub-groove, and
at least two second side sub-grooves provided on both sides of the second central sub-groove, and the display panel is foldable with a folding line configured to extend through the second central sub-groove.

11. The display panel according to claim 7, wherein:
the bearing film has a thickness of 10 μm to 120 μm, a Poisson's ratio of 0.05 to 0.75, and a Young's modulus of 0.02 GPa to 10 GPa; and/or
the support film has a thickness of 10 μm to 105 μm, a Poisson's ratio of 0.1 to 0.5, and a Young's modulus of 1 GPa to 40 GPa.

12. The display panel according to claim 1, wherein the substrate layer has a thickness of 8 μm to 18 μm, a Poisson's ratio of 0.1 to 0.6, and a Young's modulus of 0.5 GPa to 20 GPa; and/or the flexible screen body has a thickness of 10 μm to 19 μm, a Poisson's ratio of 0.1 to 0.5, and a Young's modulus of 30 GPa to 120 GPa; and/or the touch control layer has a thickness of 80 μm to 120 μm, a Poisson's ratio of 0.1 to 0.7, and a Young's modulus of 0.05 GPa to 80 GPa.

13. The display panel according to claim 1, further comprising a polarizer layer and a cover plate, wherein:

the adhesive layer comprises a first adhesive film and a second adhesive film, the first adhesive film is disposed between the flexible screen body and the touch control layer, the polarizer layer is disposed on a side of the touch control layer away from the first adhesive film, the cover plate is disposed on a side of the polarizer layer away from the touch control layer, and the second adhesive film is disposed between the polarizer layer and the cover plate.

14. The display panel according to claim 13, wherein:

the first adhesive film has a thickness of 80 μm to 120 μm, a Poisson's ratio of 0.2 to 0.5, and a Young's modulus of 0.0002 GPa to 0.001 GPa; and/or the second adhesive film has a thickness of 80 μm to 120 μm, a Poisson's ratio of 0.1 to 0.7, and a Young's modulus of 0.0002 GPa to 0.001 GPa; and/or the polarizer layer has a thickness of 120 μm to 280 μm, a Poisson's ratio of 0.1 to 0.7, and a Young's modulus of 3 GPa to 14 GPa.

15. The display panel according to claim 1, wherein the touch control layer is provided with at least one stretch-proof line, and the at least one stretch-proof line is a curved line.

16. The display panel according to claim 1, wherein the adhesive layer further comprises an edge compensation layer configured to compensate a region uncovered by the graphical base layer and the graphical link layer.

17. The display panel according to claim 1, wherein at least part of the adhesive layer is configured as a neutral layer of the display panel.

18. A display device, comprising the display panel according to claim 1.

19. The display panel according to claim 1, further comprising a cover plate, wherein the cover plate includes a plane part and an arc part, and the dividing line of the plane part and the arc part overlaps with the folding line.

20. The display panel according to claim 15, wherein the at least one stretch-proof line is an Ag nanometer line.

* * * * *